United States Patent
Takai

Patent Number: 6,140,961
Date of Patent: Oct. 31, 2000

[54] DIRECTIVITY CONTROL CIRCUITRY FOR AN ADAPTIVE ANTENNA

[75] Inventor: Kenichi Takai, Saitama, Japan

[73] Assignee: NEC Corporation, Tokyo, Japan

[21] Appl. No.: 09/289,665

[22] Filed: Apr. 12, 1999

[30] Foreign Application Priority Data

Apr. 10, 1998 [JP] Japan ................................. 10-099226

[51] Int. Cl.⁷ ................................................ H01Q 21/24
[52] U.S. Cl. ........................................... 342/367; 455/434
[58] Field of Search .................................. 342/367, 370, 342/372; 455/245.1, 434

[56] References Cited

U.S. PATENT DOCUMENTS

| | | | |
|---|---|---|---|
| 3,611,381 | 10/1971 | Preikschat | 343/100 |
| 5,109,390 | 4/1992 | Gilhousen . | |
| 5,267,261 | 11/1993 | Blakeney, II . | |
| 5,583,852 | 12/1996 | Ikeda et al. | 370/33 |
| 5,625,885 | 4/1997 | Nakazawa et al. | 455/54.1 |
| 5,815,116 | 9/1998 | Dunbridge et al. | 342/373 |
| 5,893,033 | 4/1999 | Keskitalo et al. | 455/437 |

FOREIGN PATENT DOCUMENTS

| | | |
|---|---|---|
| WO 96/37969 | 11/1996 | European Pat. Off. . |
| WO 97/00543 | 1/1997 | European Pat. Off. . |
| 58-148502 | 9/1983 | Japan . |
| 59-5704 | 1/1984 | Japan . |
| 5-22213 | 1/1993 | Japan . |
| 7-170548 | 7/1995 | Japan . |
| 8-8814 | 1/1996 | Japan . |
| 9-182148 | 7/1997 | Japan . |
| 9-200115 | 7/1997 | Japan . |
| 9-321517 | 12/1997 | Japan . |
| 10-51380 | 2/1998 | Japan . |
| 10-285092 | 10/1998 | Japan . |
| 10-313472 | 11/1998 | Japan . |

OTHER PUBLICATIONS

Foreign Search Report.

*Primary Examiner*—Thomas H. Tarcza
*Assistant Examiner*—Dao L. Phan
*Attorney, Agent, or Firm*—Foley & Lardner

[57] ABSTRACT

Circuitry for controlling the directivity of an adaptive antenna including a plurality of antenna elements and forming the directivity by varying signals fed to the antenna elements such that a gain in a preselected direction increases is disclosed. The circuitry includes a transmitting section for transmitting a scanning pilot channel for scanning on a downlink while causing the pilot channel to move in a propagation range covered by the adaptive antenna. A receiving section receives a signal representative of the intensity of the scanning pilot channel received by a mobile station. A controller detects a transmission direction in which the mobile station receives the scanning pilot channel with the highest quality, and applies the directivity parameter of the detected direction to the directivity of a downlink. The circuitry improves the directivity of the downlink in mobile communication.

12 Claims, 22 Drawing Sheets

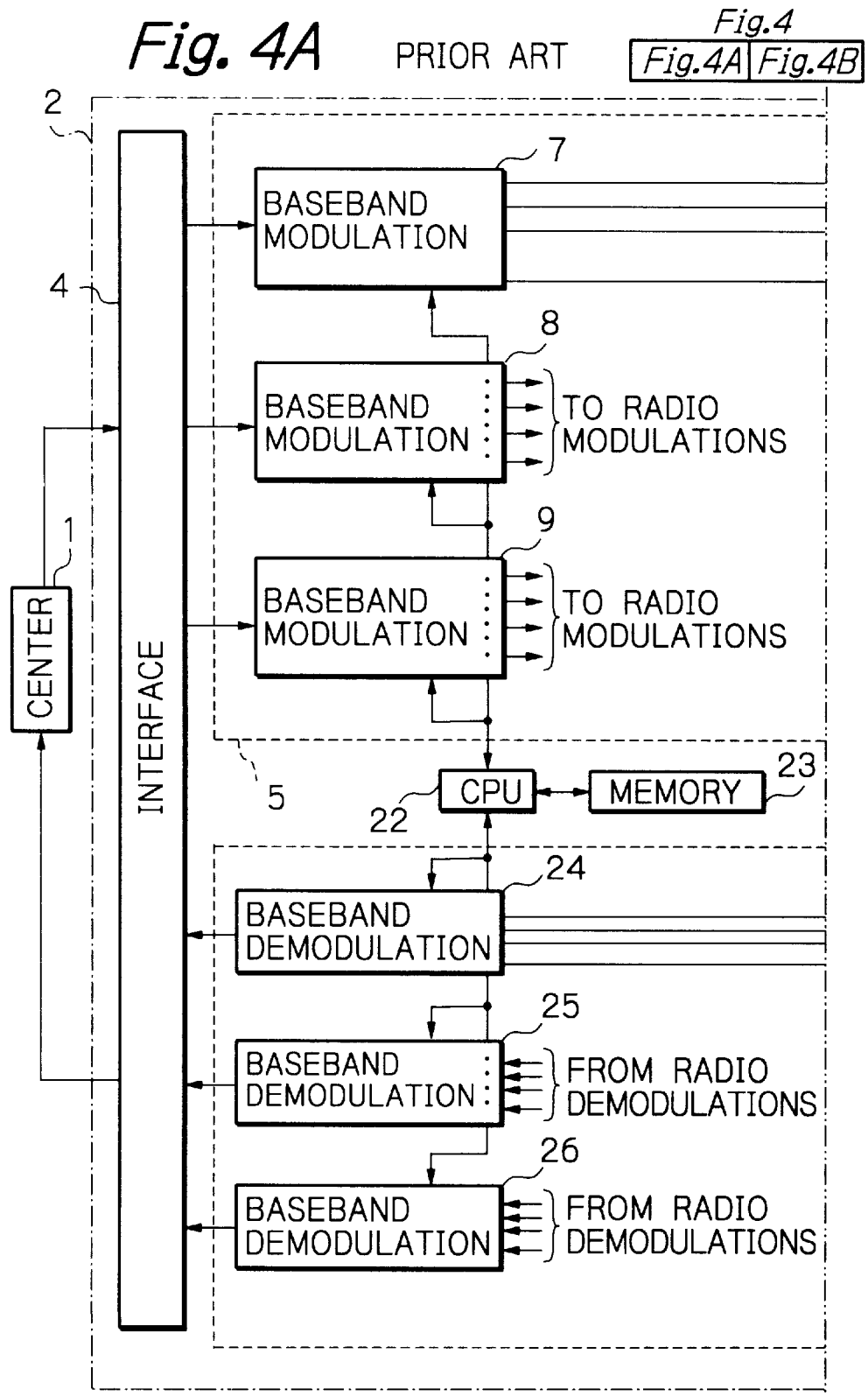

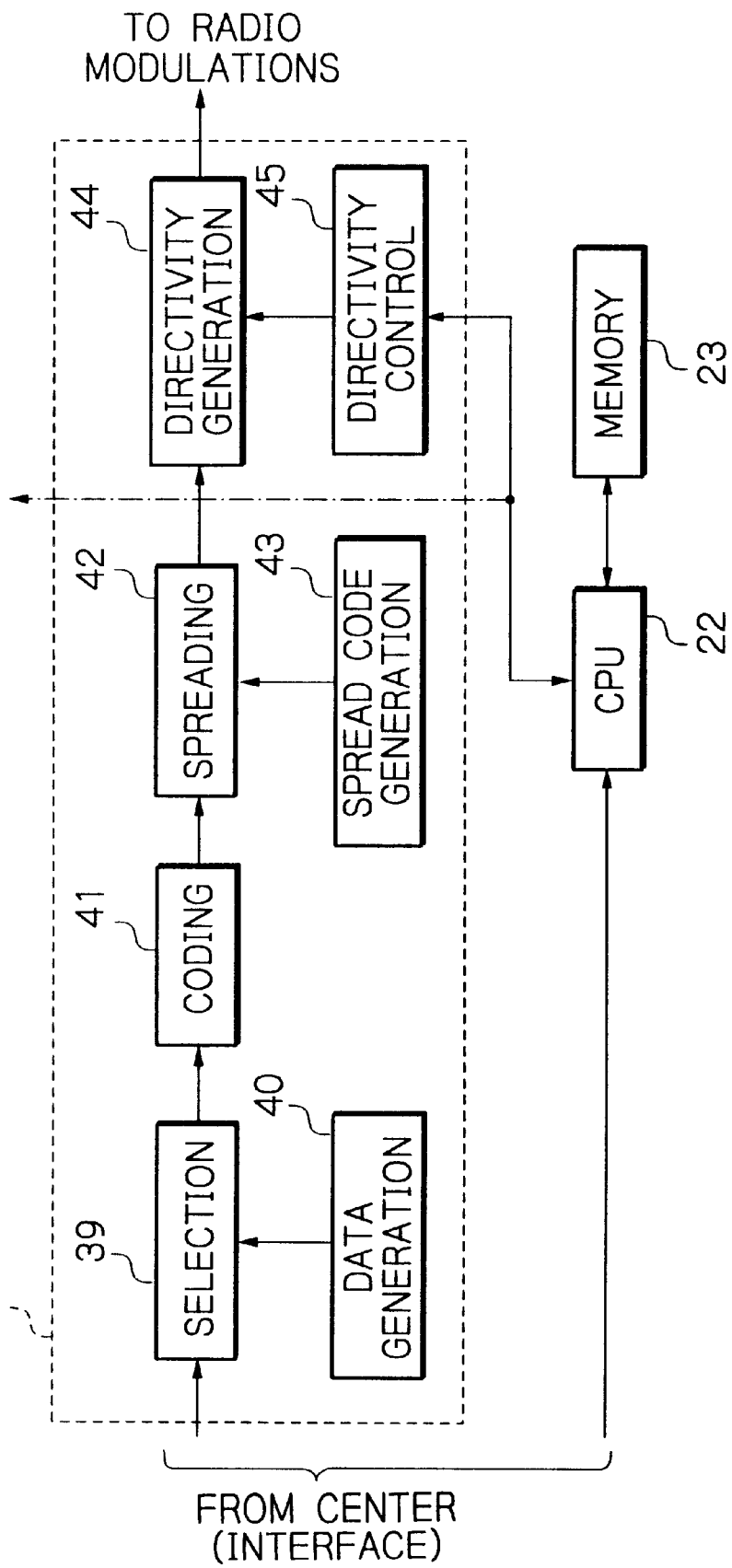

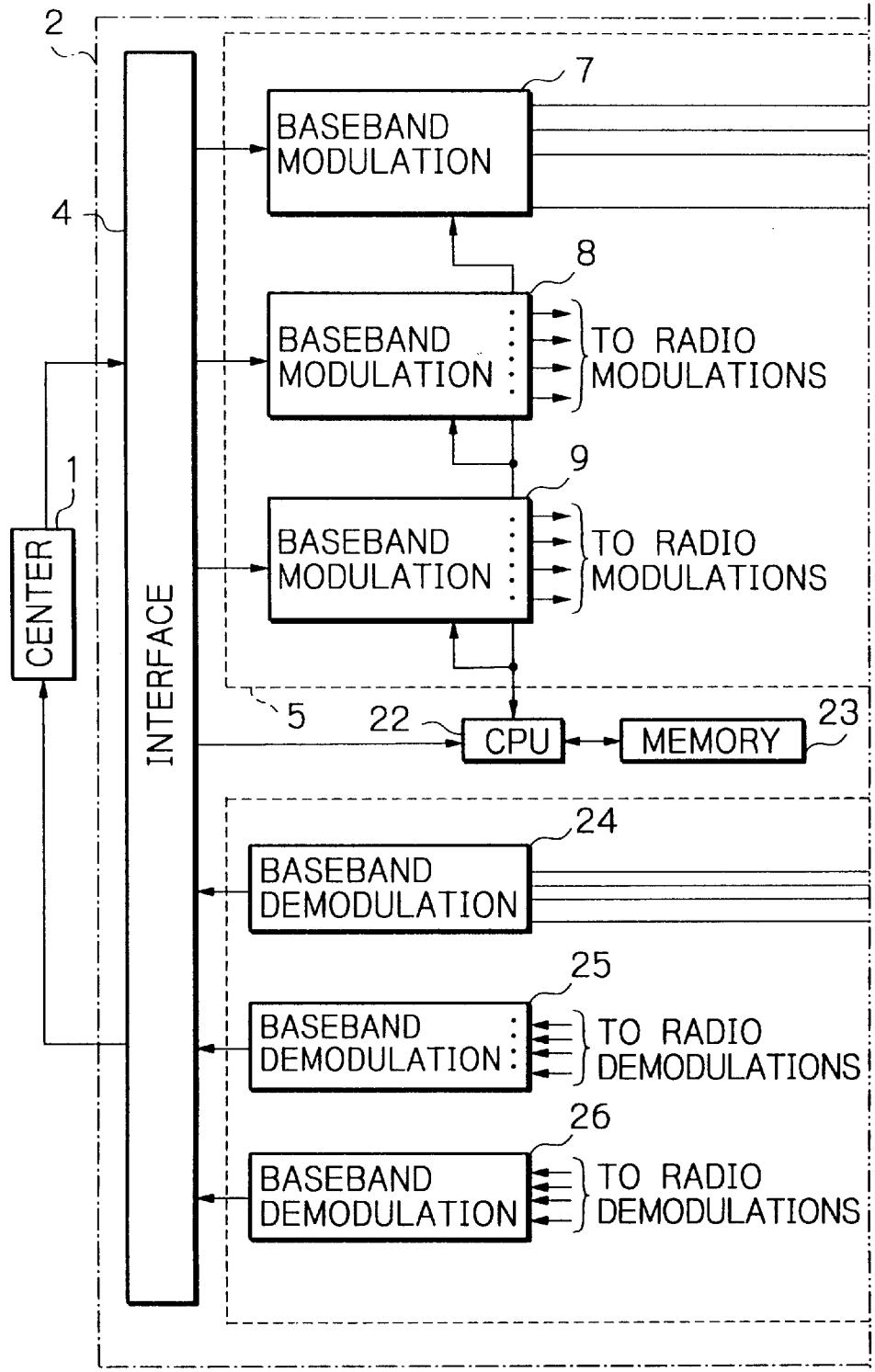

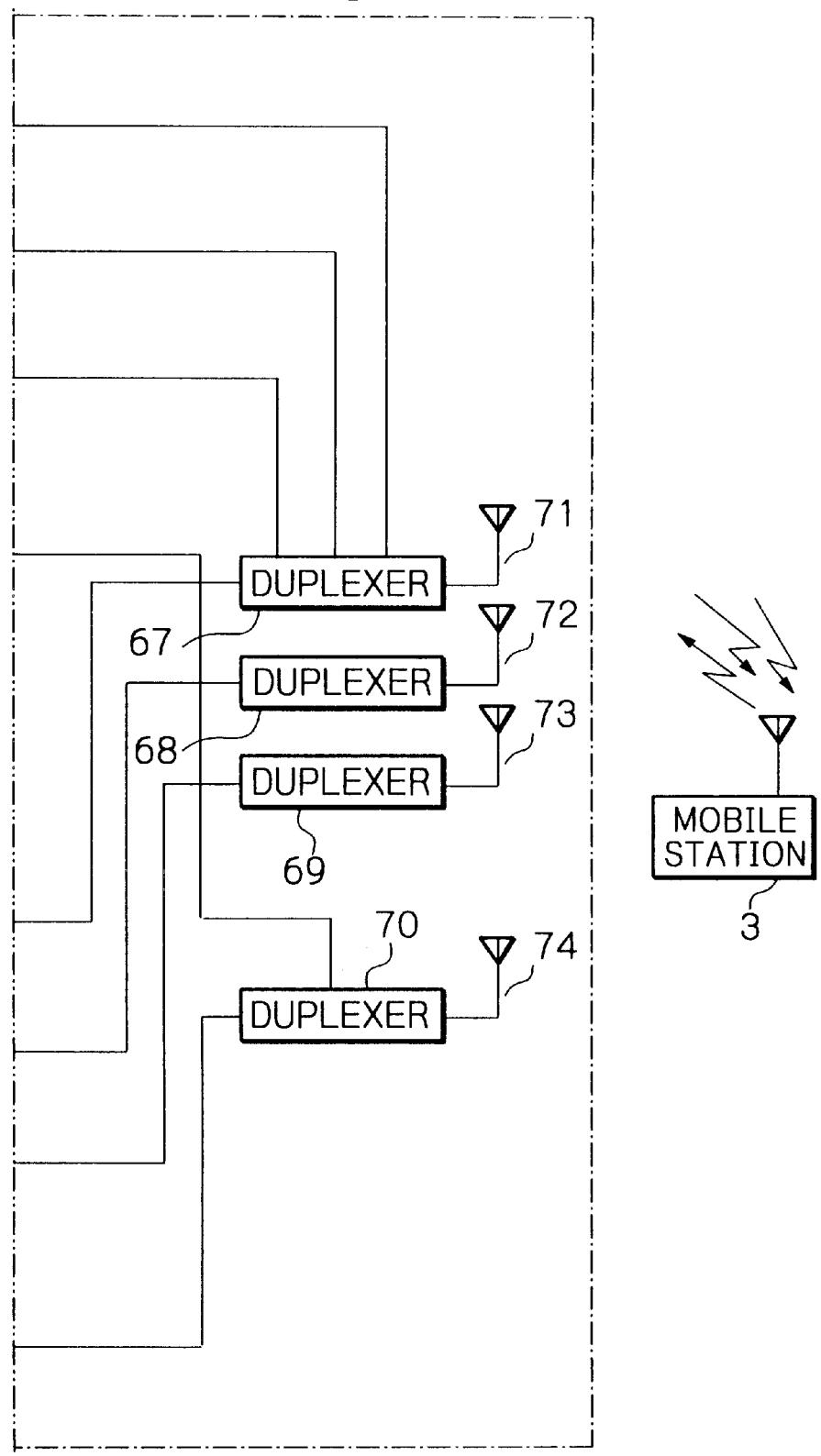

| Fig. 11 | | |
|---|---|---|
| Fig. 11A | Fig. 11B | Fig. 11C |

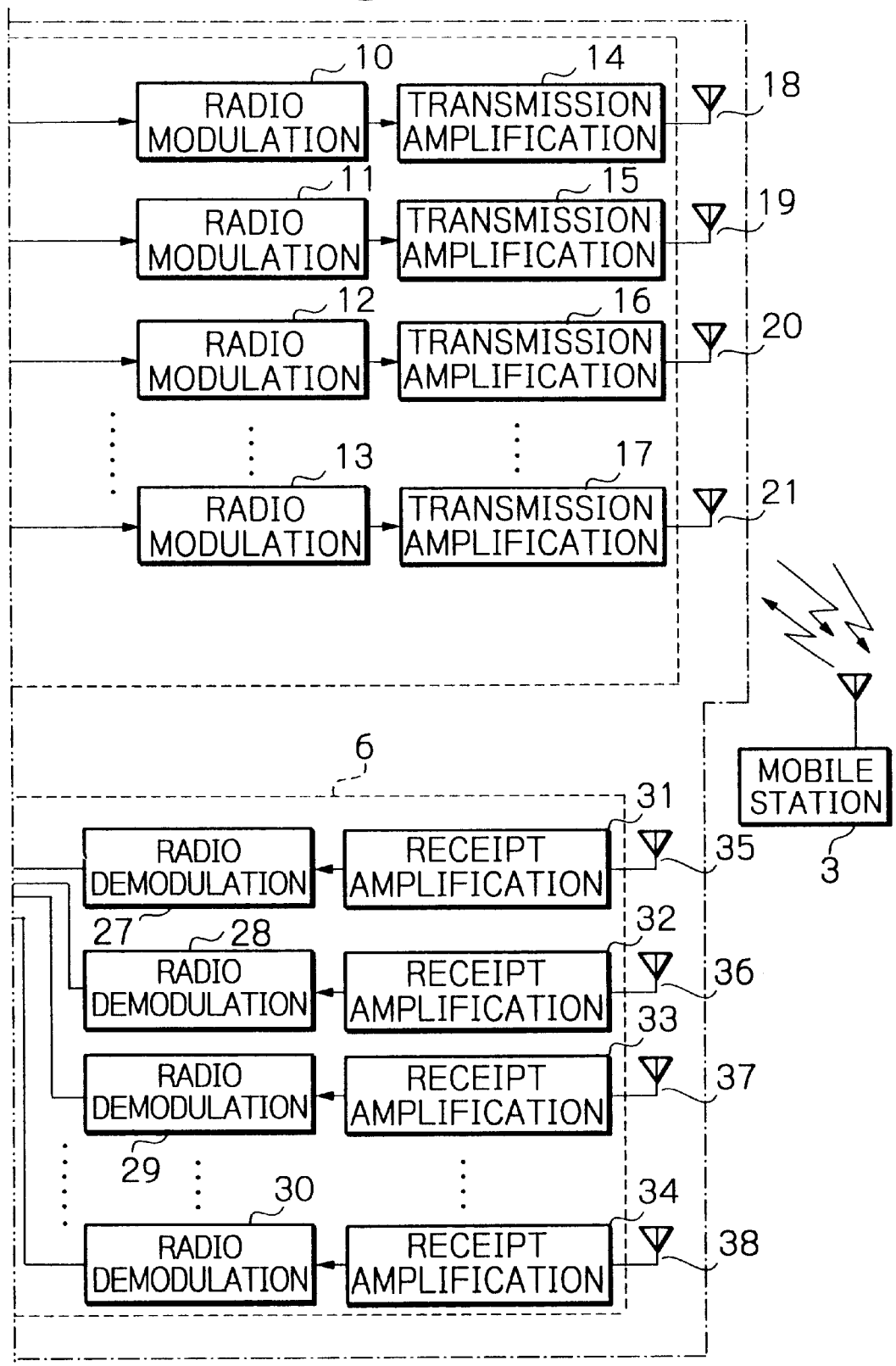

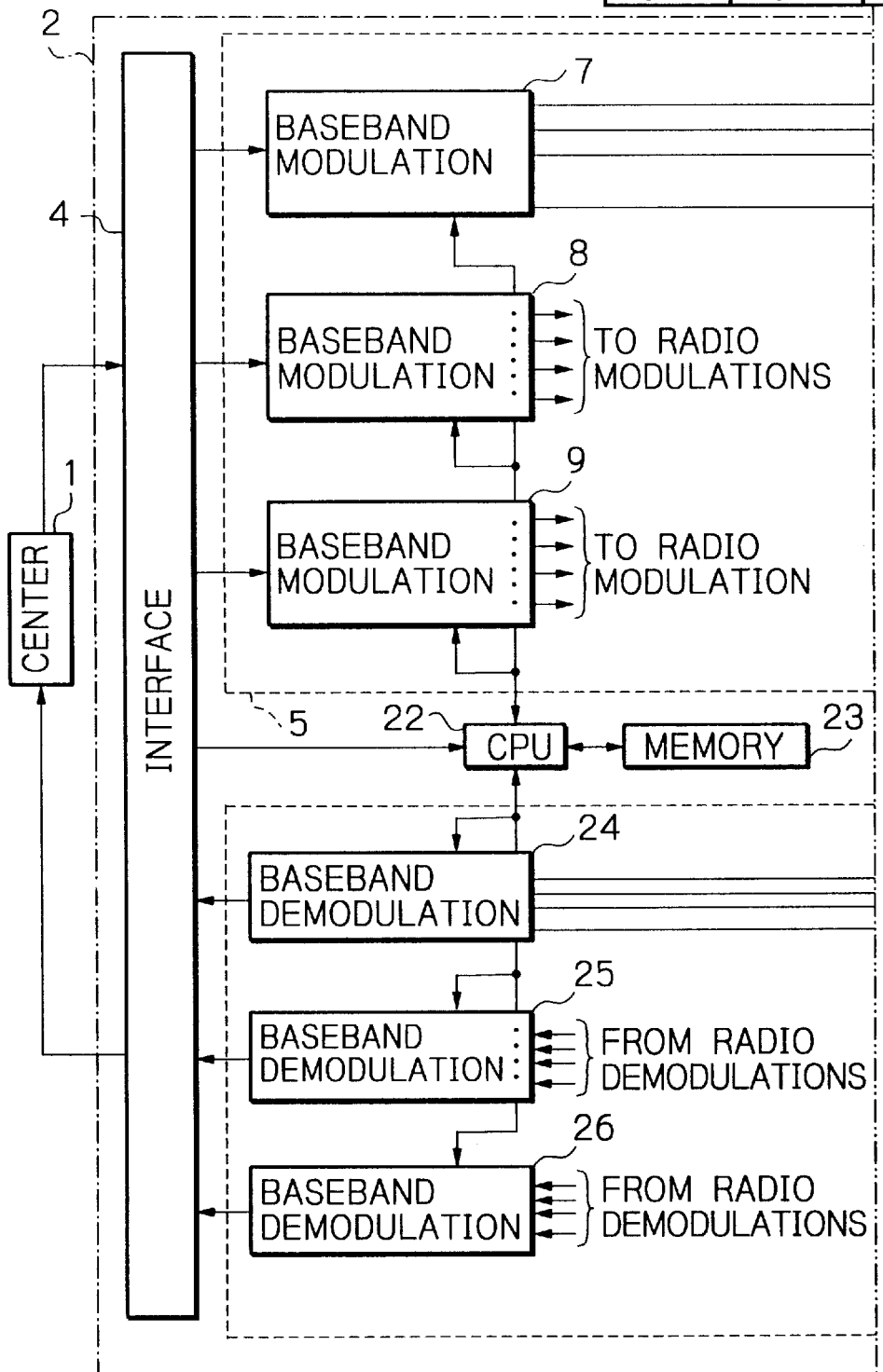

DIRECTIVITY CONTROL CIRCUITRY FOR AN ADAPTIVE ANTENNA

BACKGROUND OF THE INVENTION

The present invention relates to circuitry for controlling the directivity of an adaptive antenna and more particularly to directivity control circuitry for an adaptive antenna included in a CDMA (Code Division Multiple Access) mobile communication system.

It is a common practice with an adaptive antenna applied to mobile communication to provide a base station, rather than a mobile station, with the function of the adaptive antenna. Specifically, the adaptive antenna is more practical when installed in a base station than when installed in a mobile station from the apparatus scale standpoint. Further, as for the directivity control of the adaptive antenna, the adaptability of the control can be improved if the result of the previous control is fed back for generating the next control parameter. Therefore, installing the adaptive antenna in the receiving side is simpler than installing it in the transmitting side. For these reasons, the adaptive antenna is often adopted for directivity control on an uplink.

The above conventional scheme allows the uplink capacity to be increased because of the effect of the adaptive antenna, but cannot improve the downlink capacity at all. Moreover, the entire system cannot make the most of the effect of the adaptive antenna because the downlink capacity is the bottleneck.

In light of the above, there has been proposed to use a number of fixed directivity patterns for a downlink (multisector scheme) or to estimate the down link propagation characteristic on the basis of the parameter of uplink directivity control and then determine a directivity control parameter for the downlink.

However, it has been customary with radio communication to assign a particular frequency to each of the uplink and downlink in order to avoid interference. Therefore, the uplink and downlink do not always have the same propagation characteristic. Should the directivity parameter of the uplink be directly used as a directivity parameter for the down link, a difference would occur in propagation characteristic. Specifically, should the directivity of the downlink be sharp, it would fail to cover the location of the mobile station and would cause a signal to be sent in an unexpected direction. For this reason, it has heretofore been impractical to render the downlink directivity as sharp as the uplink directivity. That is, directivity broad enough to accommodate errors has heretofore been assigned to the downlink. This aggravates interference as to the other mobile stations and thereby limits the improvement in capacity, compared to the uplink.

Technologies relating to the present invention are disclosed in, e.g., Japanese Patent Laid-Open Publication Nos. 58-148502, 59-5704, 5-22213, 7-170548, 8-8814, 9-200115, 9-321517, 10-51380, 9-182148, 10-285092, and 10-313472.

SUMMARY OF THE INVENTION

It is therefore an object of the present invention to provide directivity control circuitry for an adaptive antenna capable of improving the capacity of a downlink.

Circuitry for controlling the directivity of an adaptive antenna including a plurality of antenna elements and forming the directivity by varying signals fed to the antenna elements such that a gain in a preselected direction increases of the present invention includes a transmitting section for transmitting a scanning pilot channel for scanning on a downlink while causing the pilot channel to move in a propagation range covered by the adaptive antenna. A receiving section receives a signal representative of the intensity of the scanning pilot channel received by a mobile station. A controller detects a transmission direction in which the mobile station receives the scanning pilot channel with the highest quality, and applies the directivity parameter of the detected direction to the downlink directivity. The circuitry improves the downlink directivity in mobile communication.

BRIEF DESCRIPTION OF THE DRAWINGS

The above and other objects, features and advantages of the present invention will become more apparent from the following detailed description taken with the accompanying drawings in which:

FIGS. 10A–10C is a schematic block diagrams showing a modification of the illustrative embodiment;

FIGS. 11A–11B are schematic block diagrams showing an alternative embodiment of the present invention;

FIGS. 14 and 14B are schematic block diagrams showing another alternative embodiment of the present invention.

DESCRIPTION OF THE PREFERRED EMBODIMENTS

To better understand the present invention, brief reference will be made to conventional circuitry for controlling the directivity of an adaptive antenna. It has been customary with an adaptive antenna applied to mobile communication to provide a base station, rather than a mobile station, with the function of the adaptive antenna, as stated earlier. This conventional scheme allows the uplink capacity to be increased because of the effect of the adaptive antenna, but cannot improve the downlink capacity at all. Moreover, the entire system cannot make the most of the effect of the adaptive antenna because the downlink capacity is the bottleneck.

Figure 1A:
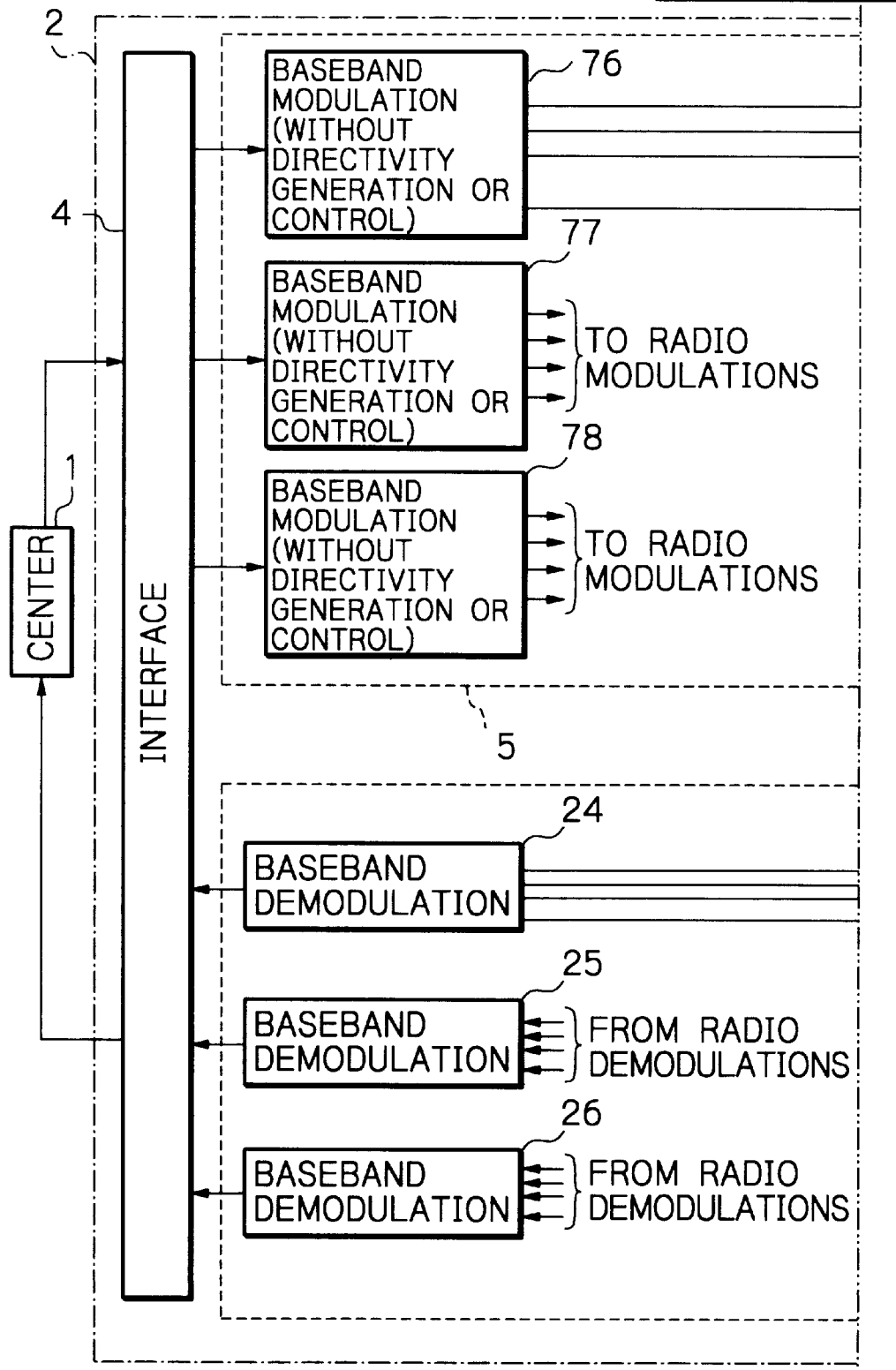
FIG. 1 is a schematic block diagram showing a specific mobile communication system using conventional directivity control circuitry for an adaptive antenna.
Figure 1B:
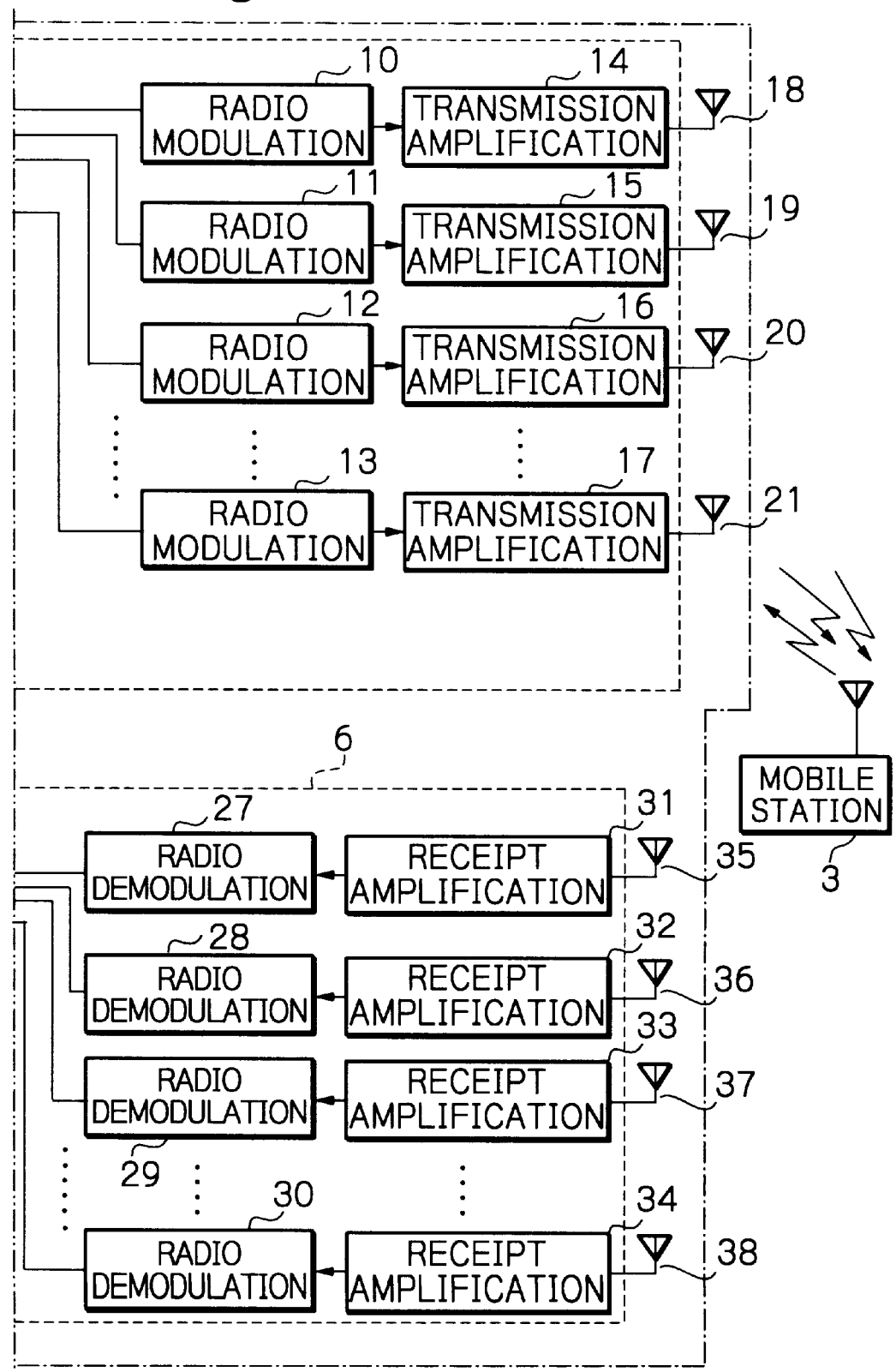
Figure 2:
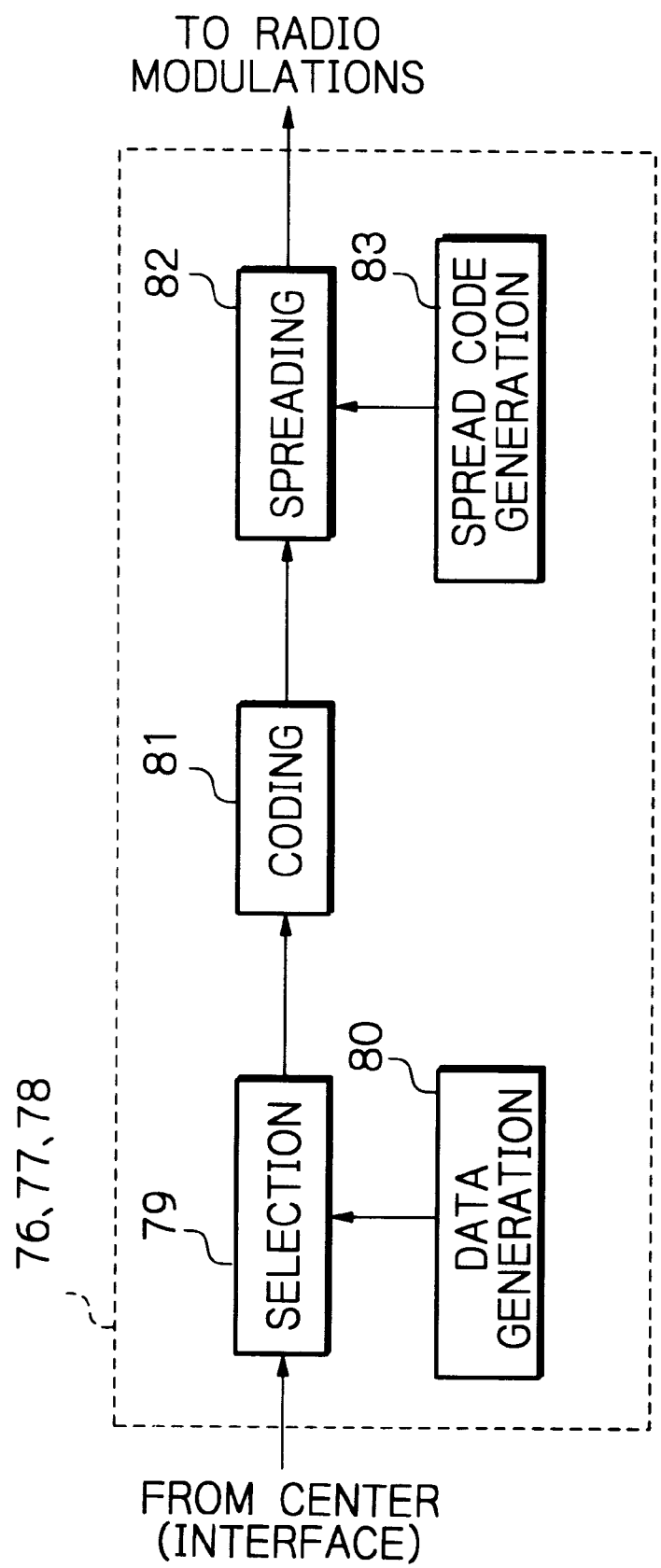
FIG. 2 is a schematic block diagram showing a specific configuration of a baseband modulating section included in the conventional circuitry.
Figure 3:
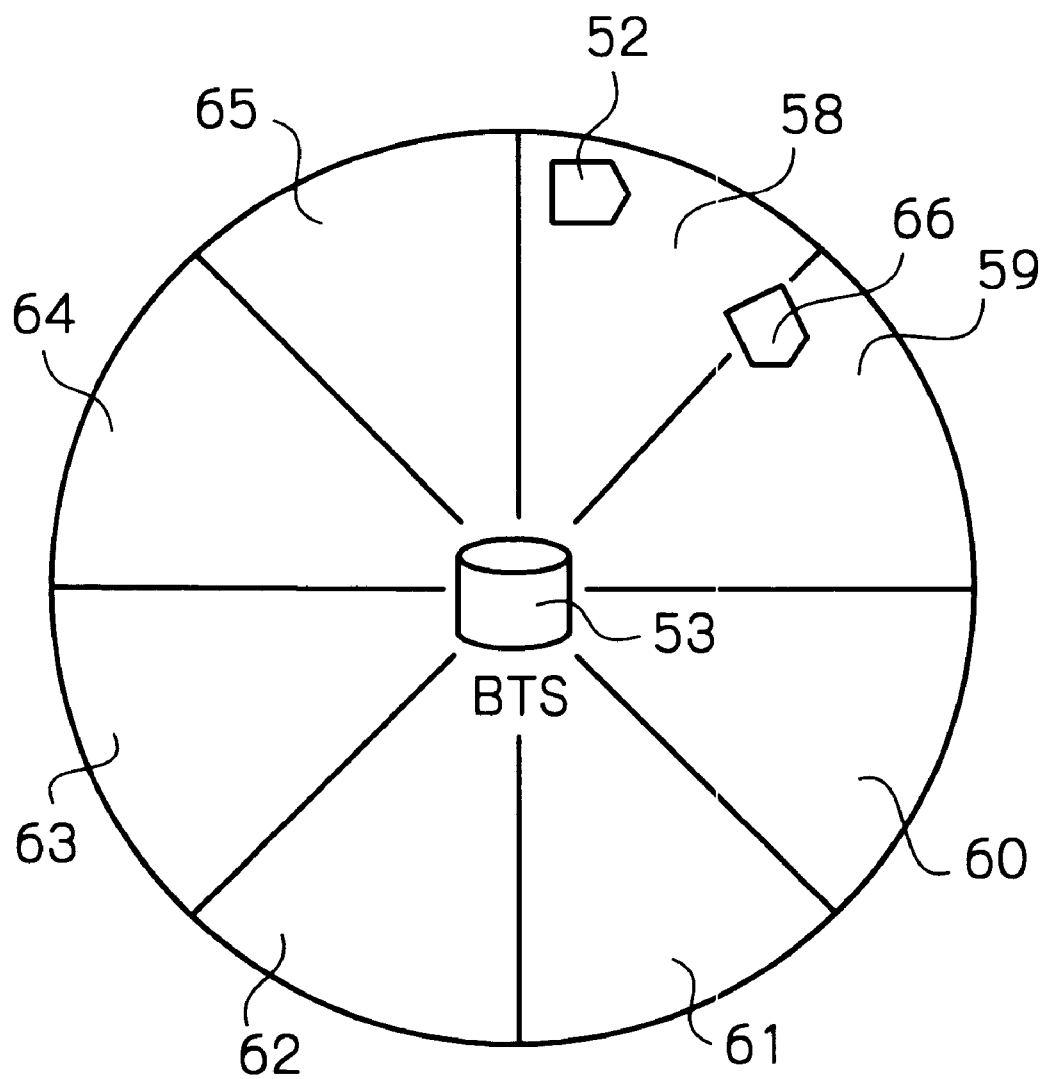
FIG. 3 is a view showing a base station and an area covered by the base station.

FIGS. 1 and 2 show a specific mobile communication system capable of improving the above situation with a number of fixed directivity patterns assigned to a downlink, i.e., a multisector scheme. As shown in FIG. 1, the system includes baseband modulations 76, 77 and 78. As shown in FIG. 2, none of the baseband modulations 76–78 includes a directivity generating section or a directivity control section. FIG. 3 shows areas 58–65 generally referred to as sectors. As shown, the area covered by a single base station is divided into a plurality of narrow sectors in order to reduce interference on a downlink.

For a mobile station 52 located at a specific position shown in FIG. 3, a base station 53 should only transmit a radio wave to the area 58. However, for a mobile station 66 located at the boundary between two nearby areas 58 and 59, the base station 53 should transmit the radio wave to both of the areas 58 and 59. This aggravates interference between the areas 58 and 59 for mobile stations other than the mobile station 66. Should many mobile stations be in the same condition as the mobile station 66, the capacity available with the downlink would be little better than before sectoring.

Figure 4B:
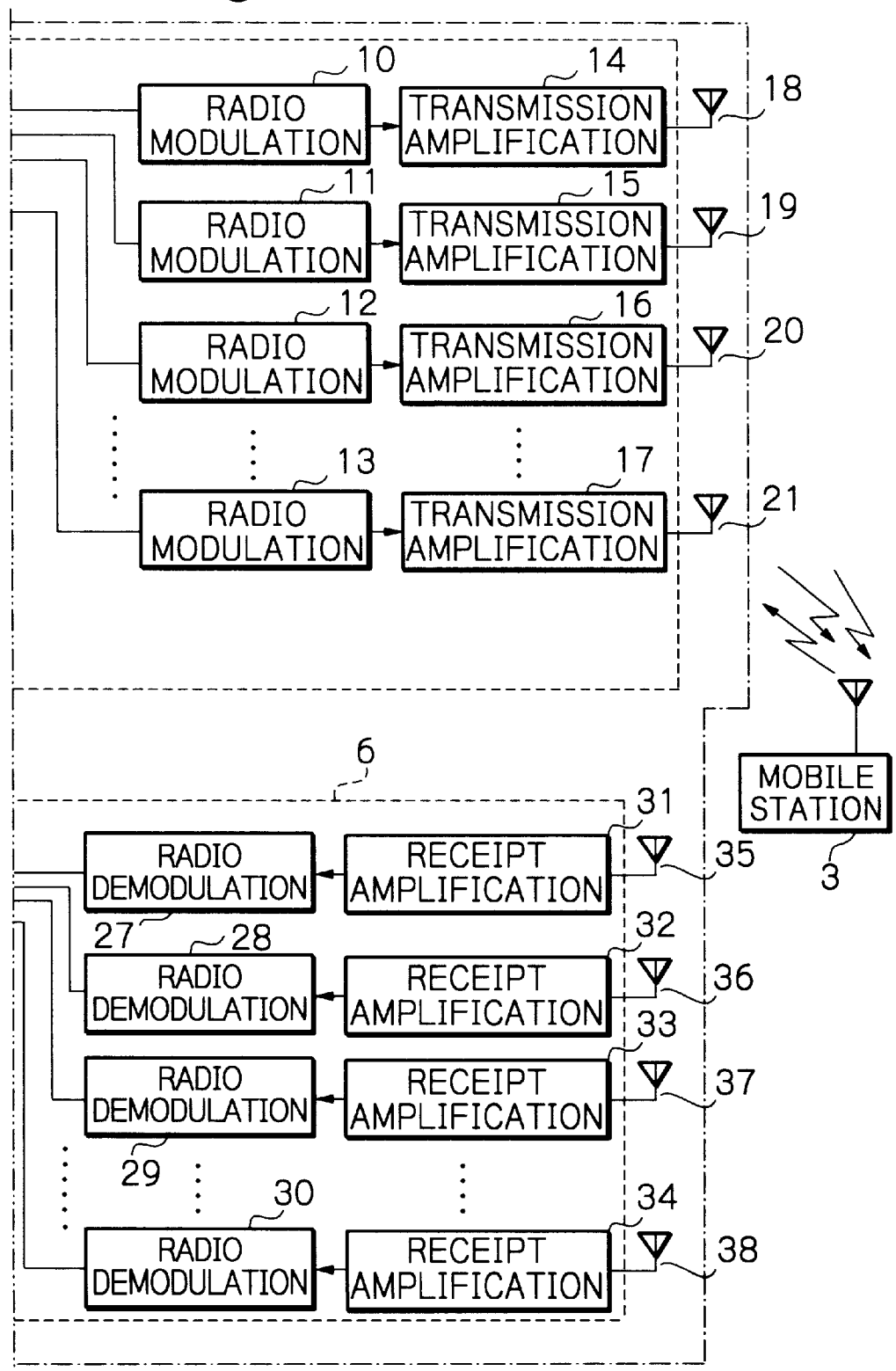
FIG. 4 is a schematic block diagram showing a specific mobile communication system using another conventional directivity control circuitry.

In light of the above, there has been proposed a mobile communication system using an adaptive antenna for the downlink also. This kind of system estimates the propagation characteristic of the downlink on the basis of the parameter of directivity control on the uplink. FIG. 4 shows the basic configuration of such a system. As shown, the system determines the parameter of directivity control on the downlink with reference to the parameter of directivity control on the uplink used by baseband demodulations 24–26.

However, it has been customary with radio communication to assign a particular frequency to each of the uplink and downlink in order to avoid interference. Therefore, the uplink and downlink do not always have the same propagation characteristic. Should the directivity parameter of the uplink be directly used as a directivity parameter for the downlink, a difference would occur in propagation characteristic. Specifically, should the downlink directivity be sharp, it would fail to cover the location of the mobile station and would cause a signal to be sent in an unexpected direction. For this reason, it has heretofore been impractical to render the directivity of the downlink as sharp as the directivity of the uplink. That is, directivity broad enough to accommodate errors has heretofore been assigned to the downlink. This aggravates interference as to the other mobile stations and thereby limits the improvement in capacity, compared to the uplink.

Figure 5A:
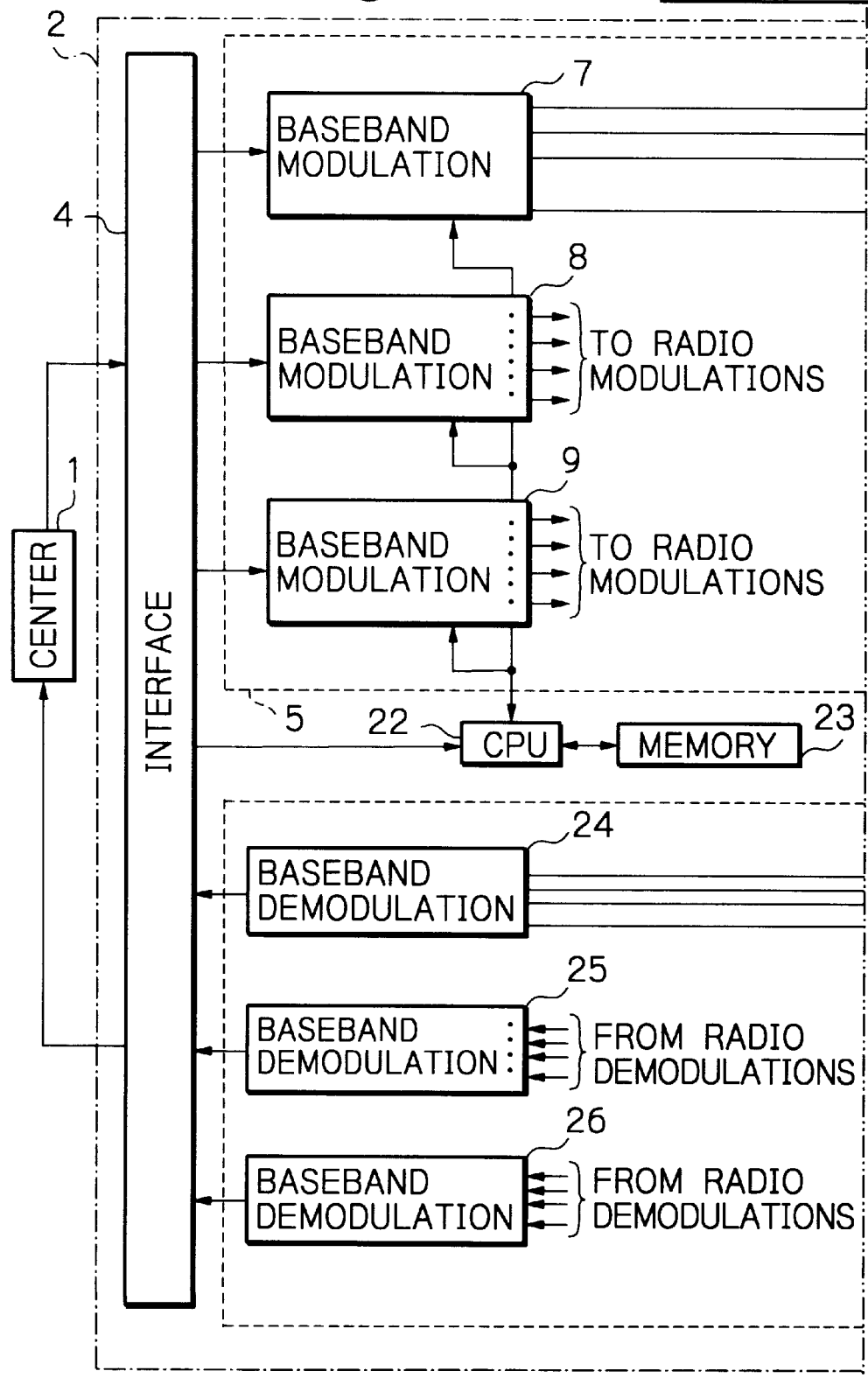
FIG. 5 is a schematic block diagram showing a specific configuration of a baseband modulating section included in the illustrative embodiment.
Figure 5B:
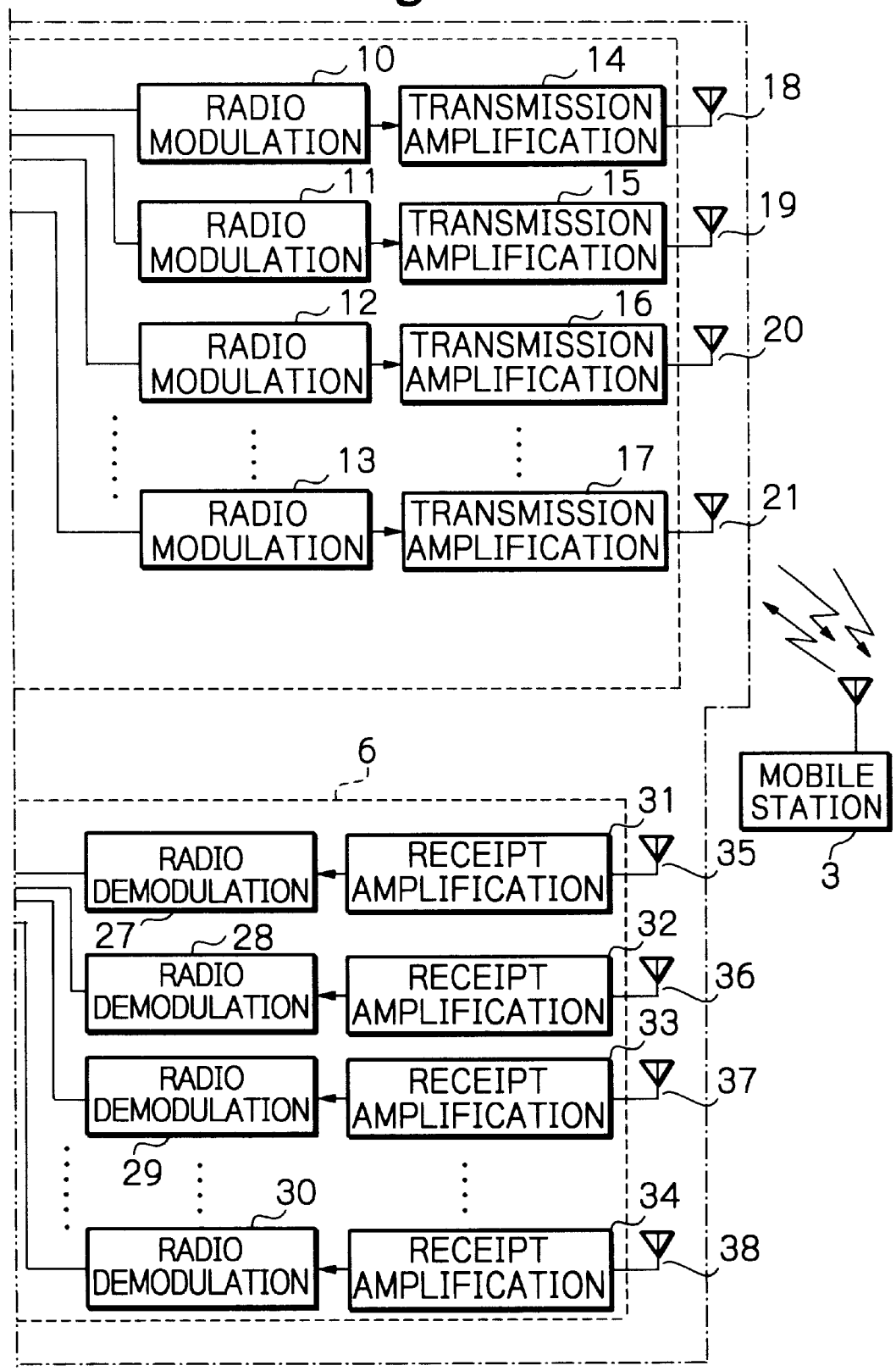

Referring to FIG. 5, a mobile communication system including directivity control circuitry embodying the present invention will be described. As shown, the system is generally made up of a center 1, a base station 2, and a mobile station 3.

The center 1 monitors and controls the base station 2 and mobile station 3. Specifically, the center 1 repeats data received from a wired network or receives data sent from the mobile station 3 via the base station 2, decodes it, and returns the decoded data to the base station 2, as needed. The base station 2 mainly performs the coding and decoding of data relating to an air interface to the mobile station 3, modulation and demodulation, and control over the mobile station 3. The base station 2 is generally made up of an interface 4 to a wired network, a transmitting section 5, and a receiving section 6.

The transmitting section 5 of the base station 2 receives data sent from the center 1 via the interface 4. In the transmitting section 5, baseband modulations 7–9 each executes particular frequency band spreading, directivity generation and so forth with the received data. Specifically, the baseband modulations 7–9 have the same function, but operate independently of each other, and each is assigned to a particular channel. While FIG. 5 shows only three baseband modulations 7–9, the base station 2, in practice, includes baseband modulating sections equal to or greater in number than the channels to be sent from the base station 2 at the same time.

The outputs of the baseband modulations 7–9 are input to and combined by radio modulations 10–13 connected to the baseband modulations 7–9. The radio modulations 10–13 each convert the frequency of the respective input to the RF (Radio Frequency) band. Transmission amplifications 14–17 each amplify the output of associated one of the radio modulations 10–13 to a preselected output. The amplified outputs of the transmission amplifications 14–17 are radiated via transmission antennas 18–21, respectively. The radio modulations 10–13, amplifications 14–17 and antennas 18–21 correspond one-to-one to each other. The output of the radio modulation 10, for example, is fed to the amplification 14 whose output is, in turn, fed to the antenna 18. It is to be noted that blocks with the same names, but different only in reference numeral, are identical in function.

The baseband modulations 7–9 each output data of one channel as a signal meant for particular one of the radio modulations 10–13. The radio modulations 10–13 each combine the signals output from the baseband modulations 7–9 and convert the frequency of the resulting composite signal to the RF band. The baseband modulations 7–9 will be described specifically later.

The receiving section 6 of the base station 2 receives signals via receipt antennas 35–38 and receipt amplifications 31–34. The receipt amplifications 13–34 each amplify the respective received signal and delivers the amplified signal to associated one of radio demodulations 27–30. The radio demodulations 27–30 each convert the frequency of the respect input to the baseband. The outputs of all of the radio demodulations 27–30 are fed to a baseband demodulation 24. At the same time, the outputs of the demodulations 27–30 are distributed also to baseband demodulations 25 and 26 via a position preceding the baseband demodulation 24. The baseband demodulations 24–26 each executes directivity generation and despreading with the respective input and send the resulting data to the center 1. The center 1 decodes signals received from the base station 2 and returns necessary information to the base station 2 in the form of a message.

A CPU (Central Processing Unit) 22 included in the transmitting section 5 receives the above message and writes it in a memory 23 while linking it to the instantaneous directivity parameter. The baseband demodulations 24–26 will be described specifically later.

Figure 6:
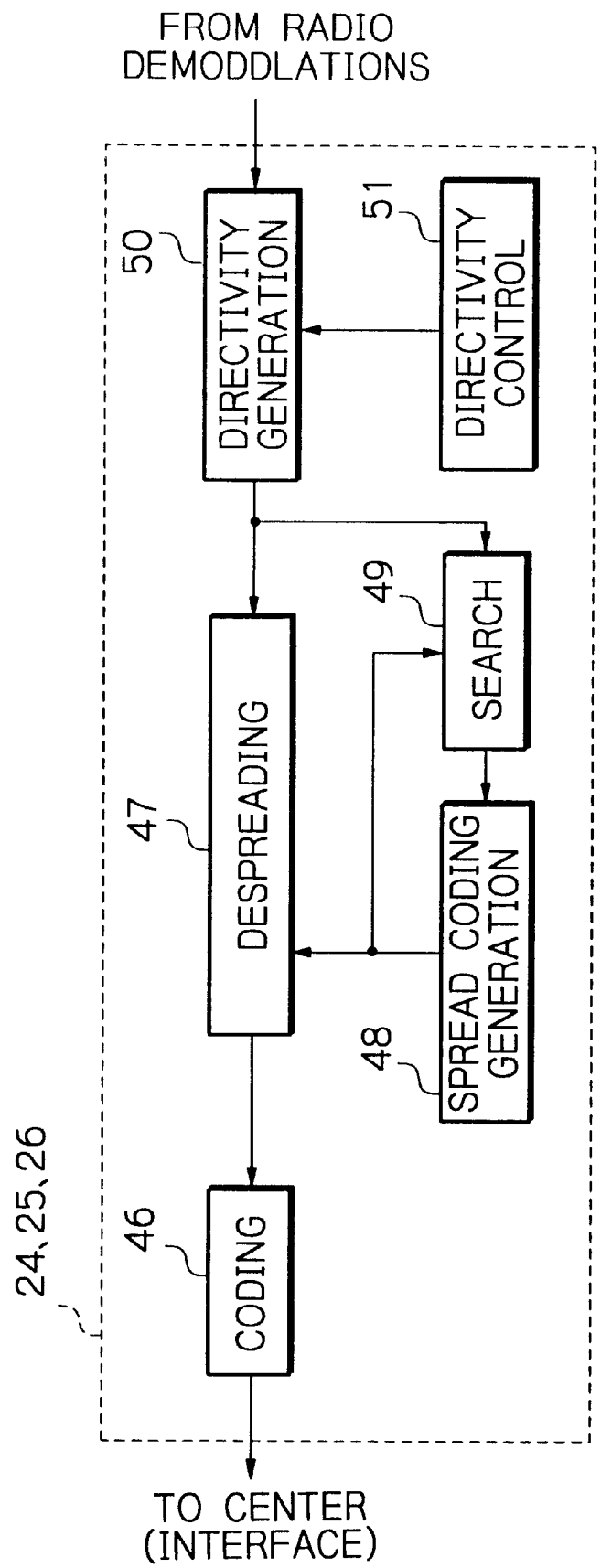
FIG. 6 is a schematic block diagram showing a specific configuration of a baseband demodulating section also included in the illustrative embodiment.

FIG. 6 shows a specific configuration of any one of the baseband modulations 7–9. As shown, data received via the interface 4 is input to a selection 39. The selection 39 selects, depending on the kind of a radio channel to be generated by the baseband modulation, either the data received from the center 1 or data output from a data generation 40 included in the baseband modulation. Usually, the data generations 40 of the baseband generations 7–9 each generate data for a pilot channel or a synchronizing channel which the base station 2 transmits to indicate its service area.

As for a traffic channel and a paging channel, the baseband modulation receives transmission data from the center 1. On receiving the data output from the selection 39, a coding 41 executes various kinds of coding including the addition of an error correction code and inter leaving. The error correction code allows the data to withstand a poor communication environment on a radio transmission path. A spreading 42 receives the output of the coding 41 and combines it with a PN (Pseudo Noise) code having a high chip rate and generated by a spread code generation 43, thereby spreading the frequency band. A directivity generation 44 generates, based on the spread signal, data matching with the radio demodulation, transmission amplification and transmission antenna associated with the baseband modulation.

In practice, the directivity generation 44 is often implemented by a DSP (Digital Signal Processor) or an ASIC (Application-Specific Integrated Circuit). The directivity generation 44 varies the amplitude and phase of the signal to be sent to a single mobile station and thereby produces data respectively matching with the transmission antennas 18–21.

A directivity control 45 optimizes a directivity parameter to be applied to the directivity generation 44 such that the signals sent via the transmission antennas 18–21 have the maximum energy when received by the mobile station 3, but have the minimum energy at locations other than the location of the mobile station 3.

The CPU 22 reads the energy of the pilot channel being received by the mobile station 3 out of the message received from the center 1. The CPU 22 writes the energy of the pilot channel in the memory 23 while linking it to the parameter set in the directivity generation 44 by the directivity control 45.

Figure 7:
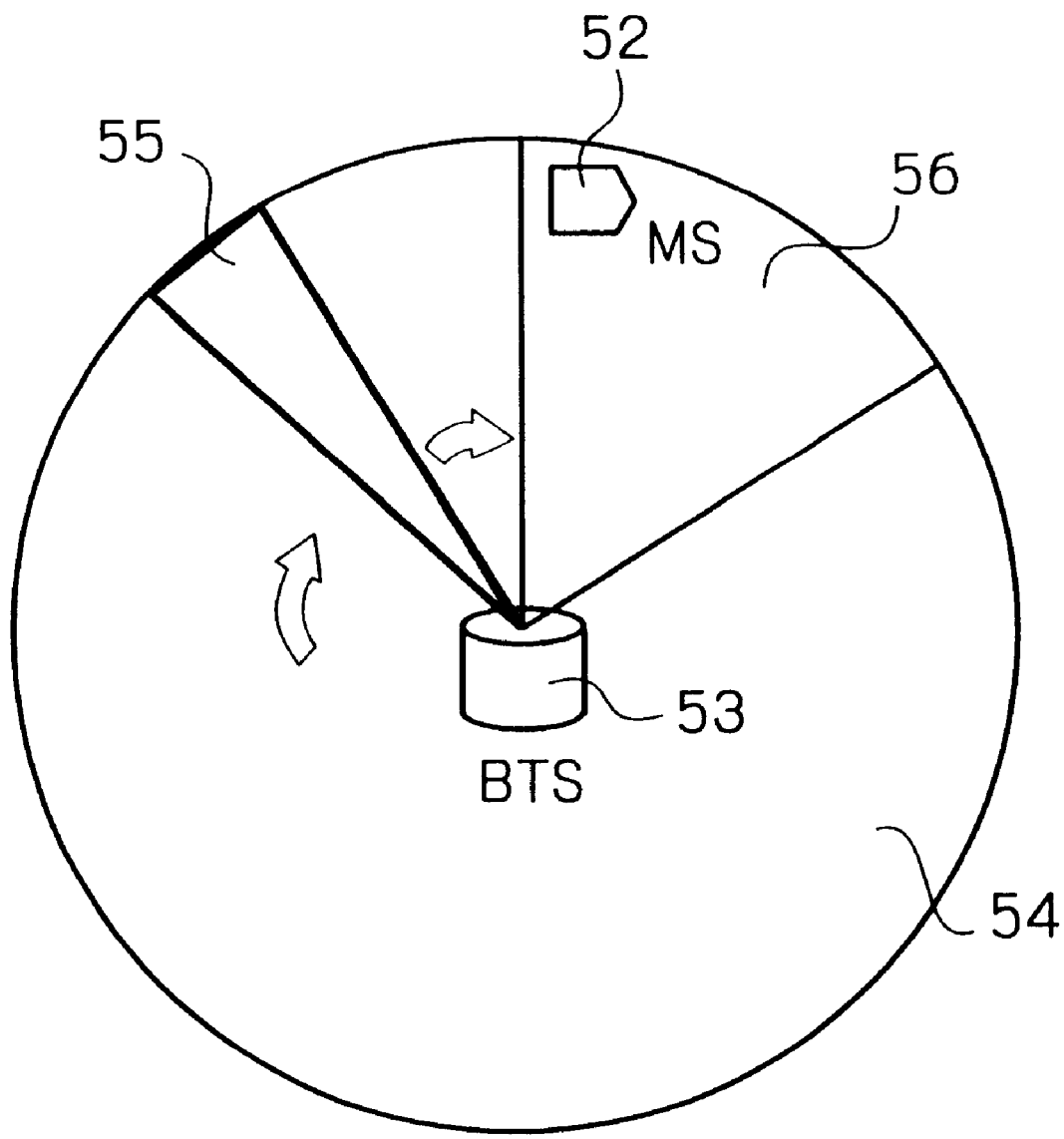
FIGS. 7–9 are views showing a base station and an area covered by the base station.

FIG. 7 shows a specific configuration of any one of the baseband demodulations 24–26. As shown, the outputs of the radio demodulations 27–30 are input to a directivity generation 50. The directivity generation 50 varies the phase and amplitude of the input signal in accordance with a directivity parameter determined by a directivity control 51. A search 49 receives the output of the directivity generation 50, combines it with a PN code generated by a spread code generation 48, and then detects the energy of the combined data.

The search 49 varies the timing at which the spread code generation 48 generates the code, and thereby searches for a timing at which the maximum energy is available. At the same time, the search 49 informs the directivity control 51 of the varying energy. A despreading 47 combines the output of the spread code generation 48 generated at the optimal timing detected by the search 49 and the output of the directivity generation 50, thereby despreading the frequency band. The output of the despreading is fed to a decoding 46 and subjected to error correction and deinterleaving. As a result, data sent from the mobile station 3 is demodulated.

Figure 8:
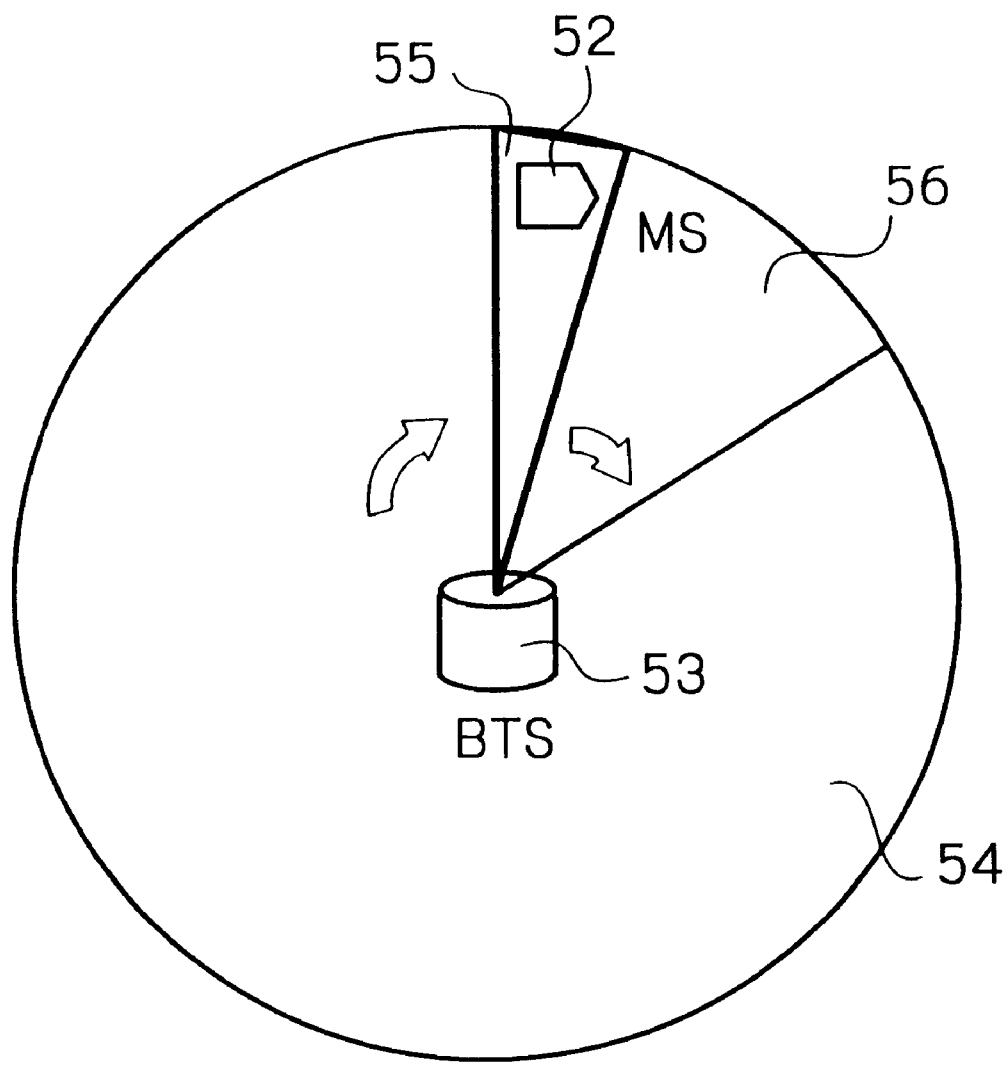

A specific operation of the circuitry shown in FIGS. 5 and 6 will be described hereinafter. FIG. 8 shows a base station 53 and the entire area 54 covered by the base station 53. As shown, a mobile station 52 is located in the area 45 and communicating with the base station 53. At this instant, the base station 53 is transmitting a radio wave having directivity represented by an area 56 to the mobile station 52.

Specifically, to form the area 56, the base station 53 transmits to the mobile station 52 a reference signal referred to as a pilot channel, some control channels for controlling the mobile station 52, and a traffic channel. While such channels each are generated by particular one of the baseband generations 7–9, they are identical in the method for generation and operation. Therefore, let the following description concentrate on the pilot channel and traffic channel while omitting the control channels.

In the baseband generation 7, the data generation 40 generates data representative of the pilot channel. The selection 39 selects the data output from the data generation 40 and delivers it to the directivity generation 44 via the spreading 42 and coding 41. The directivity generation 44 controls the amplitude and phase component of the input pilot channel data. As a result, the baseband modulation 7 outputs data particular to the radio modulation 10, i.e., different from data output from the other radio modulations.

In the baseband modulation 8, the selection 39 selects traffic channel data received from the center I via the interface 4 and delivers it to the directivity generation 44 via the coding 41 and spreading 42. The directivity generation 44 transforms the traffic channel data to data matching with, e.g., the radio modulation 10. While the structural elements of the baseband modulations respectively generating the pilot channel and traffic channel are labeled by the same reference numerals, they are, in practice, constitute physically separate blocks having the same function.

To provide the pilot channel and traffic channel to be sent to the same mobile station with identical directivity, it is necessary that the directivity parameter set in the directivity generation 44 of the baseband modulation 7 by the directivity control 45 and the directivity parameter set in the directivity generation 44 of the baseband generation 8 by the directivity control 45 be identical with each other. The CPU 22 intervenes between the directivity control section of the baseband modulation 7 and that of the baseband modulation 8 and controls them to make the above directivities identical.

As for the procedure described so far, the illustrative embodiment is identical with the conventional circuitry. In the illustrative embodiment, the baseband modulation 9 is used to generate and transmit a pilot channel for scanning (scanning pilot channel hereinafter). The baseband modulation 9 is identical in configuration with the baseband modulations 7 and 8, as stated earlier. The scanning pilot channel is a pilot channel having sharp directivity and moving in all directions in the area 54 so as to search for the mobile station 52. For this purpose, a directivity parameter set in the directivity generation 44 of the baseband modulation 9 by the directivity control 45 is so determined and updated as to cause the scanning pilot channel to rotate over the entire area 54 while varying the directivity at, e.g., a constant speed. This is contrastive to the parameters of the other baseband modulations 7 and 8.

Pilot channel data for the scanning pilot channel, like the ordinary pilot channel data, may be generated by the data generation. The scanning pilot channel data should only be different from pilot channel data used in the other areas adjoining the area 54.

The channel data output from the baseband modulations 7–9 each are combined by the respective radio modulations 10–13 and then sent via the associated transmission amplifications 14–17 and transmission antennas 18–21. As a result, as shown in FIG. 8, the pilot channel and traffic channel are present in the area 56 while the scanning pilot channel is sent to an area 55.

On the other hand, in a CDMA mobile communication system, the mobile station 52 searches for and receives not only the pilot channel forming the area 56 (pilot channel identical in directivity with the traffic channel being received) but also other pilot channels being sent to the other areas, while reporting receipt quality thereof to the base station 53. Therefore, as shown in FIG. 8, so long as the scanning pilot channel has directivity remote from the mobile station 52, the receipt quality of the scanning pilot channel reported from the mobile station 52 to the base station 53 is low.

As the scanning pilot channel approaches the mobile station 52, the quality of the scanning pilot channel being received by the mobile station 52 becomes high. The receipt quality of the scanning pilot channel becomes maximum when the pilot channel reaches a position shown in FIG. 9. Information representative of the receipt quality is sent from the mobile station 52 to the receiving section of the base station 53. In response, the base station 53 applies the above information to the CPU 22 thereof via the center 1. The CPU 22 writes the receipt quality of the scanning pilot channel in the memory 23 while linking it to the directivity parameter of the scanning pilot channel.

Figure 9:
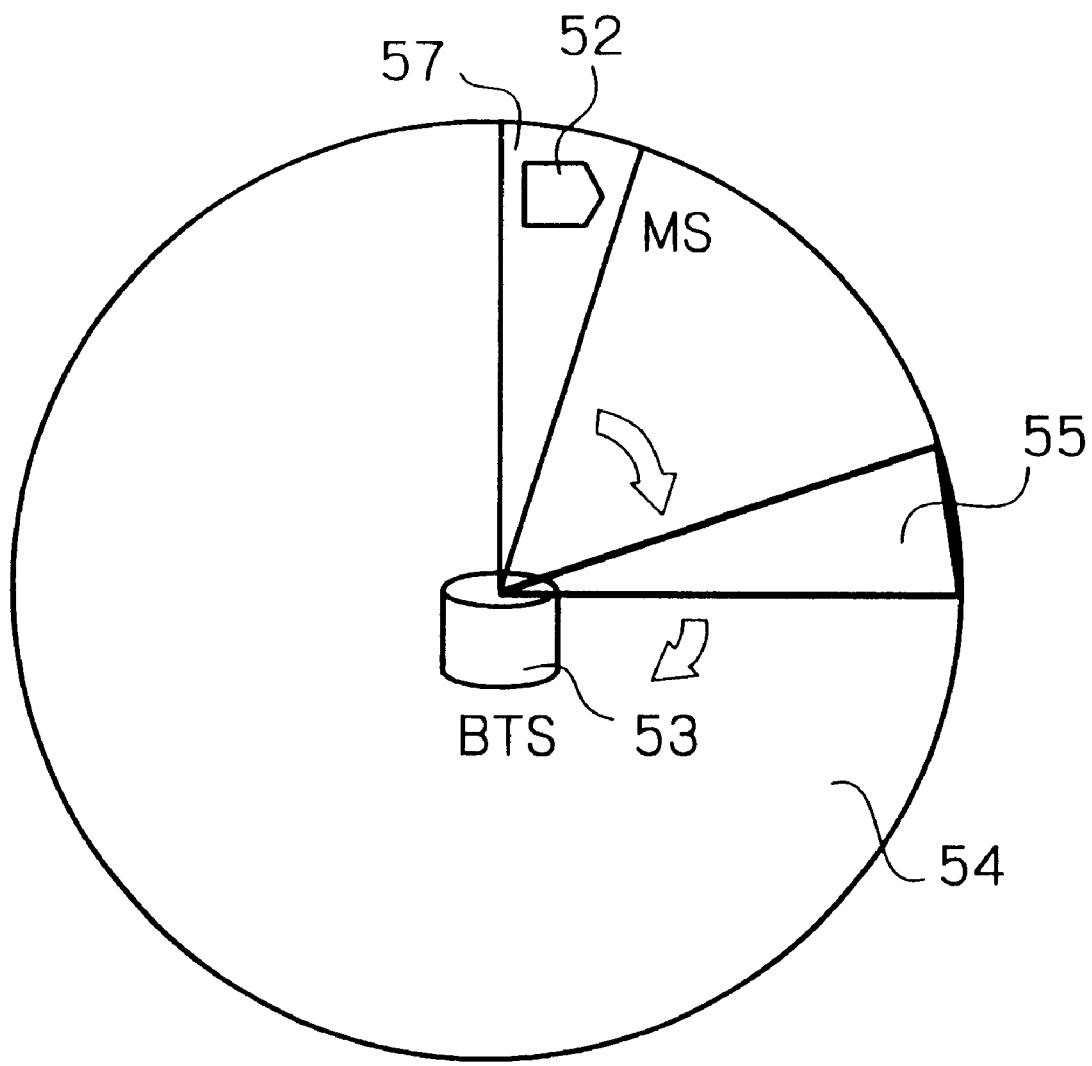

As the directivity of the scanning pilot channel moves away from the mobile station 52, the quality of the scanning pilot channel being received by the mobile station 52 again falls. As soon as the receipt quality being reported from the mobile station 52 falls below preselected quality, the CPU 22 reads the directivity parameter implemented the maximum receipt quality out of the memory 23 and assigns it to the directivity controls 45 of the baseband modulations 7 and 8. Consequently, the pilot channel and traffic channel being sent to the mobile station 52 and having a broad directivity as in the area 56, FIG. 9, is provided with directivity as sharp as the directivity of the scanning pilot channel. This is represented by an area 57 in FIG. 10.

Figure 11A:
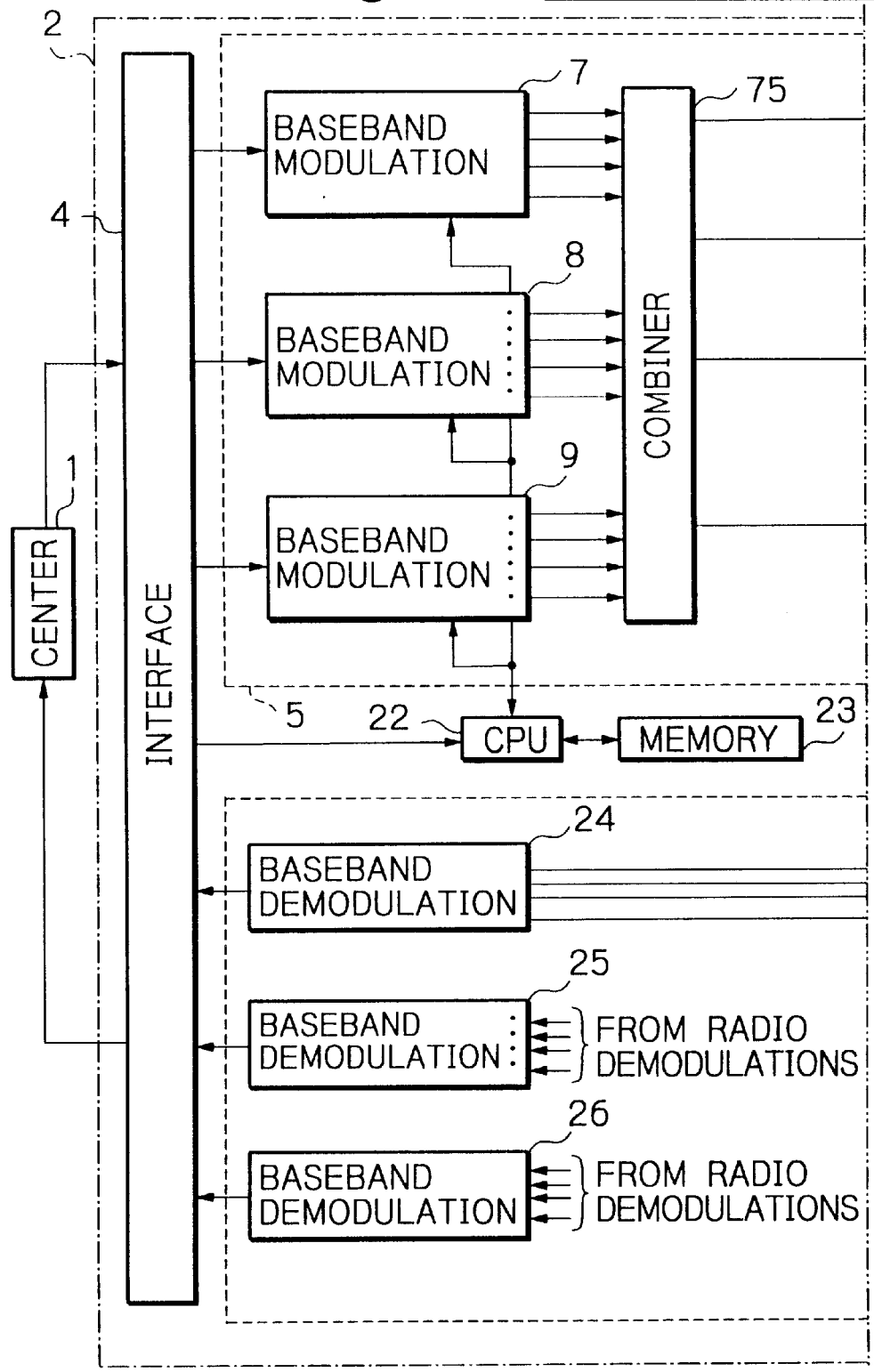
Figure 12:
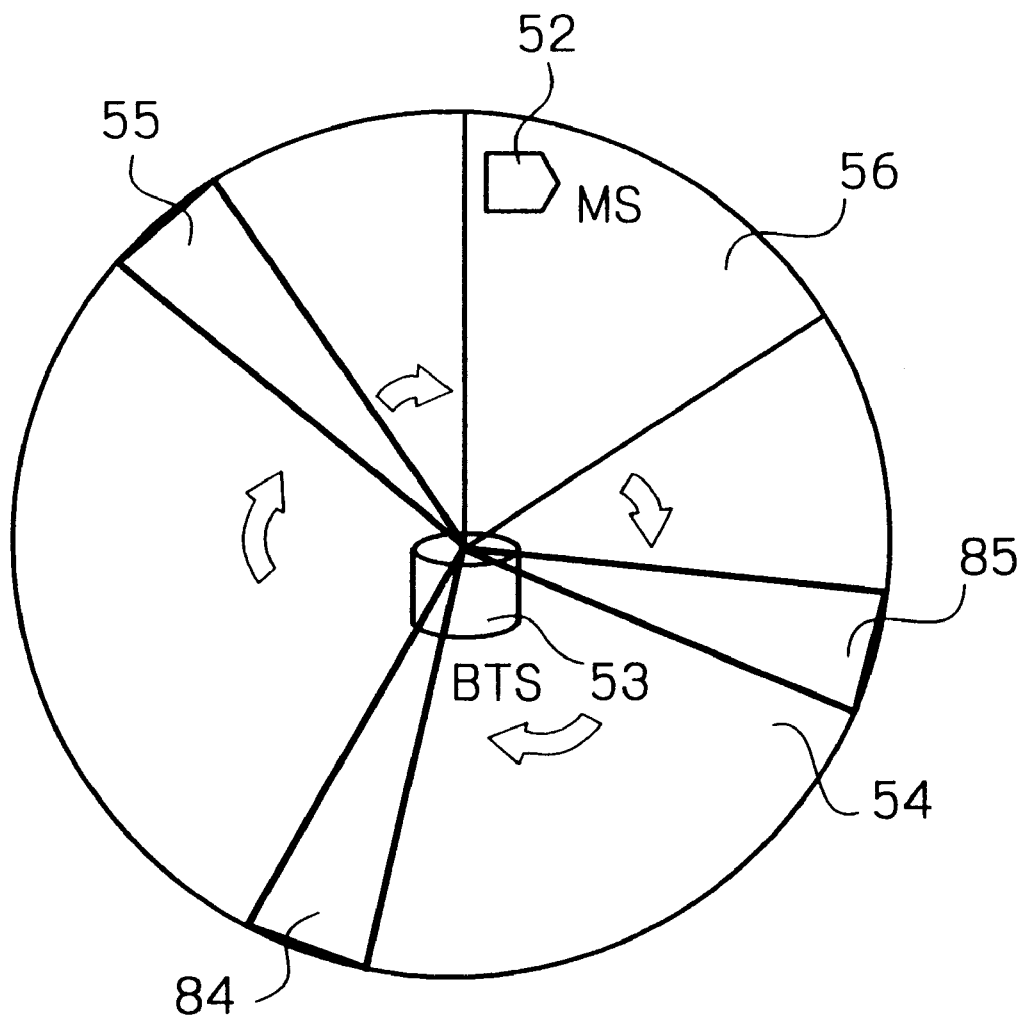
FIGS. 12 and 13 are views showing a base station and an area covered by the base station.

The above embodiment may be modified, as follows.
(1) The transmission antennas 18–21 shown in FIG. 5 may be replaced with transmission/receipt antennas 71–74 shown in FIG. 11, in which case antenna duplexers 67–70 will be connected, as illustrated in FIG. 11.
(2) In FIG. 5, the outputs of the baseband modulations 7–9 each are generated within the respective radio modulations 10–13. Alternatively, as shown in FIG. 12, a combiner 75 may intervene between the baseband modulations 7–9 and the radio modulations 10–13, so that signals combined by the combiner 75 can be input to the radio modulations 10–13.
(3) While the radio modulations 10–13 and transmission amplifications 14–17 are shown in FIG. 5 as being separate from each other, one of them may be included in the other. This is particularly advantageous with an adaptive antenna using a plurality of radio transmitting sections because the output of each transmitting section can be reduced and because the transmission amplifications 14–17 can be included in the radio modulations 10–13, respectively.
(4) While the radio demodulations 27–30 and receipt amplifications 31–34 are also shown in FIG. 5 as being separate from each other, one of them may be included in the other.

None of the above mod if i cat ions substantially changes the crux of the illustrative embodiment.

Figure 13:
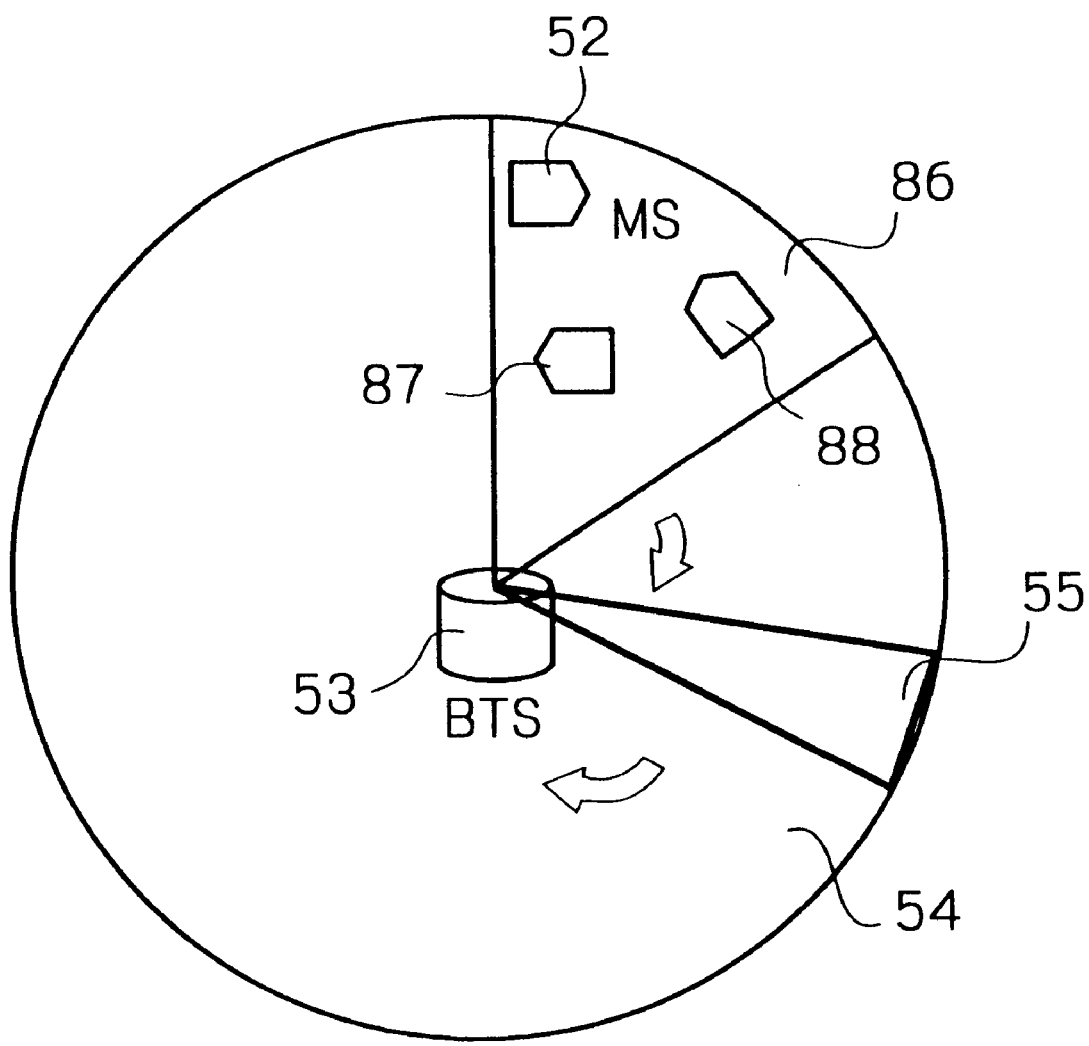

An alternative embodiment of the present invention will be described with reference to FIG. 13. The embodiment described with reference to FIGS. 8–10 uses a single scanning pilot channel. As shown in FIG. 13, the alternative embodiment uses a plurality of (three in FIG. 13) scanning pilot channels at the same time. Such scanning pilot channels can be formed independently of each other only if a plurality of baseband modulating sections each having the configuration of the baseband modulation 9, FIG. 5, are used. However, the prerequisite is that each scanning pilot channel be represented by particular data. As for the rest of construction and operation, this embodiment is identical with the previous embodiment.

The above alternative embodiment successfully reduces the scanning time and improves real-time control over the directivity of the downlink.

Figure 10B:
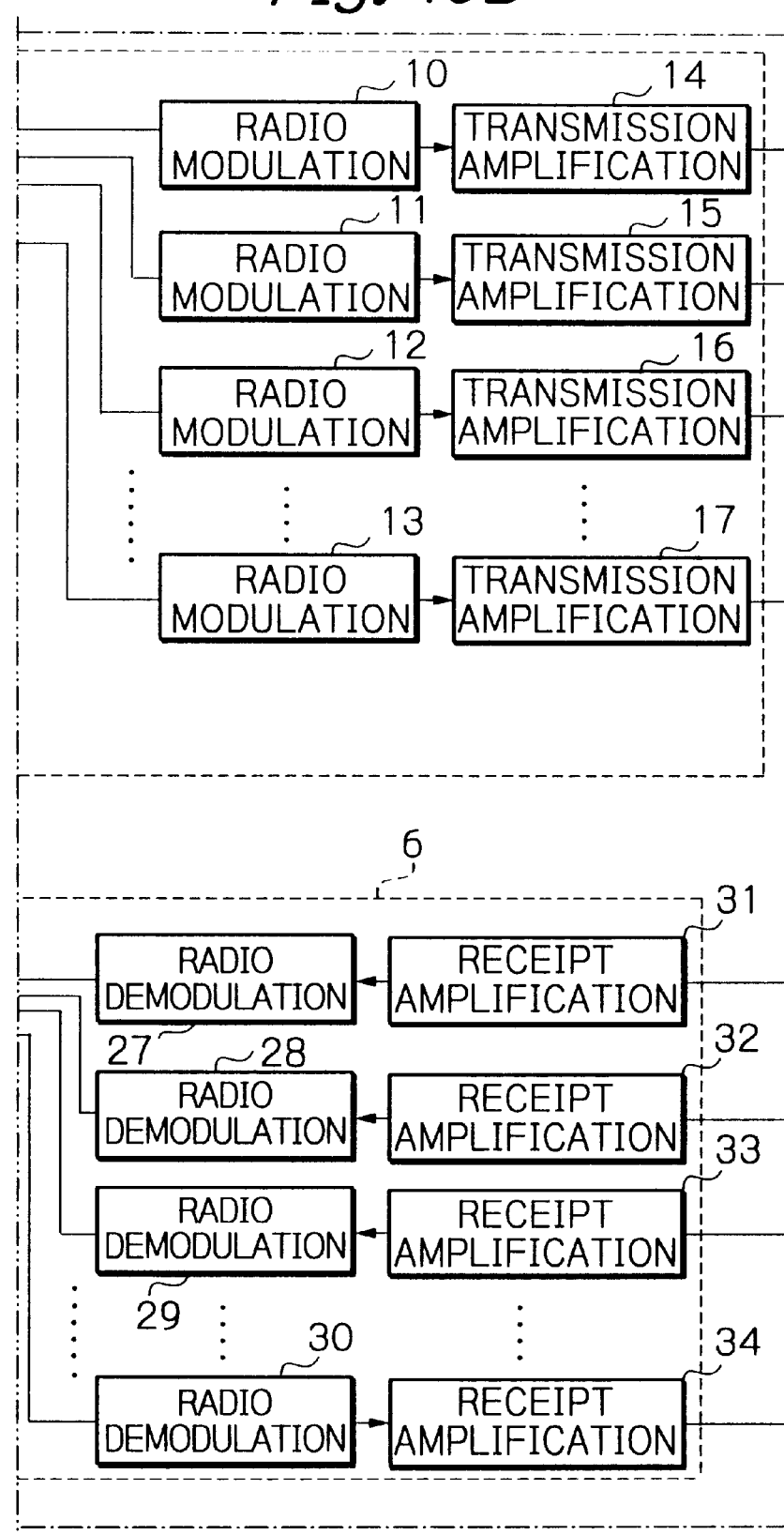
Figure 14B:
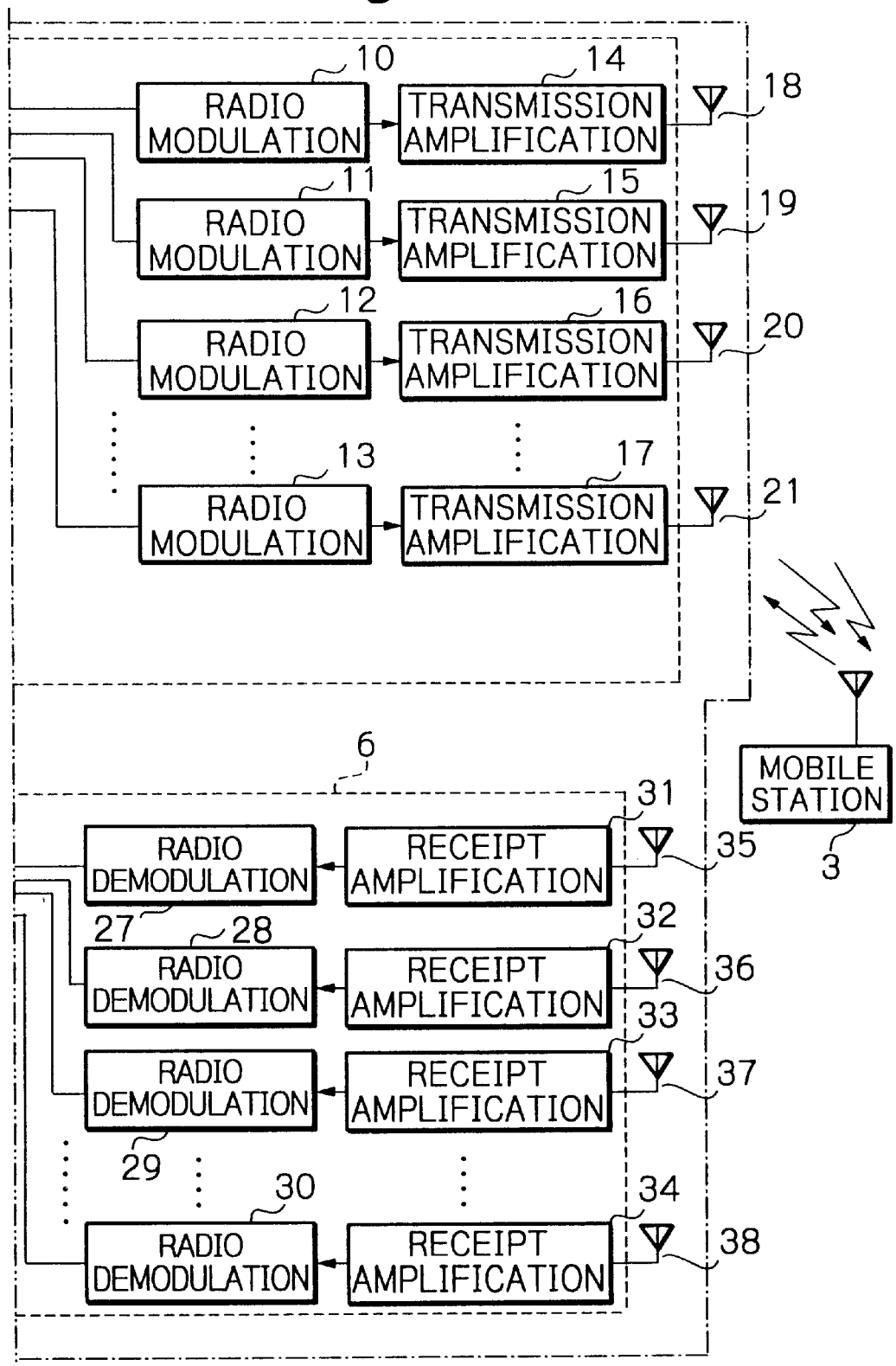

Reference will be made to FIG. 14 for describing another alternative embodiment of the present invention. In FIG. 10, the directivity parameter of the scanning pilot channel occurring when the mobile station 52 receives the scanning pilot channel with the maximum quality is assigned to the pilot channel and traffic channel as a directivity parameter. In FIG. 14, the directivity of the pilot channel and traffic channel is set such that an area 86 formed by the pilot channel having been used by the mobile station 52 covers even other mobile stations 87 and 88. This can be done with circuitry shown in FIG. 15. As shown, the CPU 22 reads a directivity parameter set in the directivity generating section of each of the baseband modulations 24–26 by the associated directivity control section. The CPU 22 determines a directivity parameter for the down link on the basis of the directivity of the uplink and the directivity of the scanning pilot channel.

This embodiment allows a plurality of nearby mobile stations to exist in a single area or sector and thereby obviates frequent hand-off. In addition, even when the scanning period of the scanning pilot channel is increased, and when the propagation characteristic sharply changes, the circuitry can follow the directivity to a certain degree if the downlink reflects the variation of control over the directivity of the uplink.

In summary, it will be seen that the present invention provides a directivity control circuitry for an adaptive antenna having various unprecedented advantages, as enumerated below.

(1) The circuitry allows a mobile station to accurately detect a direction in which it can receive a downlink channel with the highest quality. This is because the circuitry uses a scanning pilot channel identical in frequency with a pilot channel and a traffic channel, which are conventional, and uses the result of actual receipt of the scanning pilot channel by a mobile station.

(2) The circuitry is usable without regard to the configuration or the manufacturer of a mobile station. Specifically, the scanning pilot channel can share the same transmission data as the conventional pilot channel and does not require a mobile station to include a special receiver. In addition, the function of reporting the receipt quality of a pilot channel from a mobile station to a base station is essential with a CDMA mobile communication system, among others.

(3) Interference between radio waves on a downlink occurs little because the pilot channel and traffic channel can be allocated to the direction in which a mobile station can receive a signal from a base station with the highest quality.

Various modifications will become possible for those skilled in the art after receiving the teachings of the present disclosure without departing from the scope thereof.

What is claimed is:

1. Circuitry for controlling a directivity of an adaptive antenna including a plurality of antenna elements and forming the directivity by varying signals fed to said plurality of antenna elements such that a gain in a preselected direction increases, said circuitry comprising:

a transmitting section for transmitting a scanning pilot channel for scanning on a downlink while causing said scanning pilot channel to move in a propagation range covered by the adaptive antenna;

a receiving section for receiving a signal representative of an intensity of said scanning pilot channel received by a mobile station; and a controller for detecting a transmission direction in which the mobile station receives said scanning pilot channel with the highest quality, and applying a directivity parameter of said direction detected to a directivity of a downlink.

2. Circuitry as claimed in claim 1, wherein said transmitting section transmits said scanning pilot channel having a directivity while varying a direction of transmission, said circuitry further comprising a memory in which said controller monitoring receipt quality of said scanning pilot channel received from the mobile station writes a directivity parameter of a direction of said scanning pilot channel occurring when said mobile station receives said scanning pilot channel with the highest quality.

3. Circuitry as claimed in claim 2, further comprising an assigning section for assigning the directivity parameter stored in said memory to a directivity generating section assigned to a channel on which the mobile communication is communicating.

4. Circuitry as claimed in claim 1, wherein said transmitting section transmits said scanning pilot channel in a plurality of directions.

5. Circuitry as claimed in claim 1, wherein a directivity parameter of the mobile station is used as a directivity parameter for forming an area including other mobile stations adjoining said mobile station.

6. Circuitry as claimed in claim 1, wherein said circuitry is applied to a CDMA mobile communication system.

7. A method of controlling a directivity of an adaptive antenna including a plurality of antenna elements and forming the directivity by varying signals fed to said plurality of antenna elements such that a gain in a preselected direction increases, said method comprising the steps of:

transmitting a scanning pilot channel for scanning on a downlink while causing said scanning pilot channel to move in a propagation range covered by the adaptive antenna;

receiving a signal representative of an intensity of said scanning pilot channel received by a mobile station; and detecting a transmission direction in which the mobile station receives said scanning pilot channel with the highest quality, and applying a directivity parameter of said direction detected to a directivity of a downlink communication channel.

8. A method as claimed in claim 7, further comprising the steps of:

transmitting said scanning pi lot channel having a directivity while varying a direction of transmission;

monitoring receipt quality of said scanning pilot channel received from the mobile station; and storing a directivity parameter of a direction of said scanning pilot channel occurring when the mobile station receives said scanning pilot channel with the highest quality.

9. A method as claimed in claim 8, further comprising the step of assigning the directivity parameter stored to a directivity generating section assigned to a channel on which the mobile communication is communicating.

10. A method as claimed in claim 7, wherein said scanning pilot channel is transmitted in a plurality of directions.

11. A method as claimed in claim 7, wherein a directivity parameter of the mobile station is used as a directivity parameter for forming an area including other mobile stations adjoining said mobile station.

12. A method as claimed in claim 7, wherein said method is applied to a CDMA mobile communication system.

* * * * *